United States Patent [19]

Serenbetz

[11] Patent Number: 4,894,654

[45] Date of Patent: Jan. 16, 1990

[54] METHOD AND APPARATUS FOR RESERVING PARKING SPACES AND/OR SECURITY

[76] Inventor: George B. Serenbetz, P.O. Box 196, Carnelian Bay, Calif. 95711

[21] Appl. No.: 233,761

[22] Filed: Aug. 19, 1988

[51] Int. Cl.[4] .......................... G08G 1/14; B60Q 1/48

[52] U.S. Cl. .......................... 340/932.2; 340/825.69; 340/825.72

[58] Field of Search .................... 340/51, 696, 825.69, 340/825.72, 116, 117, 114 R, 114 B

[56] References Cited

U.S. PATENT DOCUMENTS

| | | | |
|---|---|---|---|
| 3,727,228 | 4/1973 | Taylor et al. | 340/114 R |
| 3,738,309 | 6/1973 | Nicholl | 340/114 B |
| 4,318,079 | 3/1982 | Dickinson | 340/51 |
| 4,665,395 | 5/1987 | Van Ness | 340/51 |

*Primary Examiner*—Donnie L. Crosland
*Attorney, Agent, or Firm*—Herbert C. Schulze

[57] ABSTRACT

A method and apparatus for practicing the method by which parking spaces may be reserved and blocked off for use of a designated individual and for security wherein a cylinder or the like is caused to protrude from the parking surface in such manner that it effectively blocks a parking space, driveway, or the like and in which a specially coded radio control or the like is utilized for purposes of lowering the obstruction when it is approached by a vehicle which should properly utilize the space.

11 Claims, 3 Drawing Sheets

METHOD AND APPARATUS FOR RESERVING PARKING SPACES AND/OR SECURITY

CROSS REFERENCE TO RELATED PATENT APPLICATIONS

There are no patent applications related to this application filed by me.

BACKGROUND OF THE INVENTION

1. Field of the Invention

This invention is in the general field of parking space control and security. The invention is more particularly directed to a method and means for effectively obstructing and blocking a parking area so that unauthorized vehicles cannot enter. The invention is even further directed to such a method and means as has been mentioned wherein an authorized vehicle or individual will have a coded means of removing the obstruction and it is further characterized and in the field of a device which disappears into the parking surface or rises from the parking surface when desired.

2. Description of the Prior Art

Closing off parking areas for single use of particular individuals and the like is quite common. Also, it is frequently necessary to close off an area for security or other reasons. The methods used for such closures are usually chains or wires strung between two posts at the edges of the designated space and can also include barricades which are placed in front of a parking space or other area . Additionally, a common practice is to mark such a parking space with a sign or the like indicating the name or other designation of a single individual, vehicle, or organization permitted to use that space. I know of no prior art, however, in which a cylinder or the like is implanted within the parking space itself and which is controlled by radio or the like in such manner that it physically obstructs the space but may be easily removed by disappearing into the parking surface itself upon a proper coded signal or the like. In this respect there is no prior art known to me as compared to the invention disclosed in this patent application.

SUMMARY OF THE INVENTION

Parking spaces for automobiles and the like are becoming increasingly scarce, and particularly with the large amount of vehicular travel, frequently persons will park their vehicles in a private driveway or in a parking area specifically provided for a particular person or the like. Also, for special security or other reasons, it is sometimes desired to block an area from any traffic.

Increasingly, large buildings housing offices and other businesses provide parking structures, frequently several stories high, either beneath, or otherwise in some manner in conjunction with the business establishment. In such cases, it is common to reserve parking areas for certain tenants of the building or others. Most frequently this is accomplished by placing a sign on a wall adjacent to the parking space or by painting a name or other designation on the surface of the parking area. Quite often posts are provided at the edges of the parking space and a chain or the like will be placed between them to prevent access to the parking area. When a chain or the like is used as described it is generally cumbersome and difficult to use and requires exit from the vehicle to replace it when the vehicle concerned leaves its particular space.

Painted signs and the like are frequently ignored totally and thus become ineffective as a deterrent to those who are not authorized to use the particular space. Likewise when a sign is used, it frequently becomes necessary to change the sign upon a change of tenancy or the like. This is always a costly procedure.

Further, enforcement proceedings are frequently necessary and these become costly. It is frequently necessary to have an attendant constantly checking reserved parking spaces and the like. When improperly parked vehicles are found it becomes necessary to obtain a tow truck, or the like, resulting in considerable cost and inconvenience to all concerned.

I have studied this problem at length and have conceived and developed an extremely effective, unique, method and apparatus for insuring the privacy or security, of parking spaces, driveways, or other areas in which unauthorized vehicles should not be found. I have accomplished this by providing a power actuated cylinder which is mounted within the earth, concrete structure, or other place where a vehicle will be parked and which can be caused to be moved upwardly so as to block the parking space concerned by means of radio or other remote control and can be made to disappear into the ground or parking structure with its surface flush with the parking surface when it is desired to park the proper vehicle in the proper space. There are several means by which I can accomplish this method. The power can be from several different sources. I have found that a worm, or screw type arrangement, is most preferable since it automatically locks in position when the power is deactivated, and additionally, an inexpensive direct current motor can be used and it can be powered by a battery, all self contained within the cylinder in such manner that no external electrical source need be utilized.

Additionally I have found that I can install a pressure sensitive device such that the motor will reverse if by chance it should be activated accidentally when a vehicle or other object was over the device thus avoiding damage to such vehicle or the like.

It is an object of this invention to provide a means of securing a parking area or the like from unauthorized use.

Another object of this invention is to provide such a means of securing an area from unauthorized parking or use wherein the device may be activated and deactivated remotely by an authorized individual.

Another object of this invention is to provide such a device and method as has been described wherein there will be safety features to prevent damage or injury through any malfunction of the device.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 8 illustrates an alternate embodiment of a device utilizing a pneumatic cylinder or the like;

FIG. 9 illustrates another alternate embodiment utilizing hydraulic power or the like.

DESCRIPTION OF A PREFERRED EMBODIMENT

Figure 1:
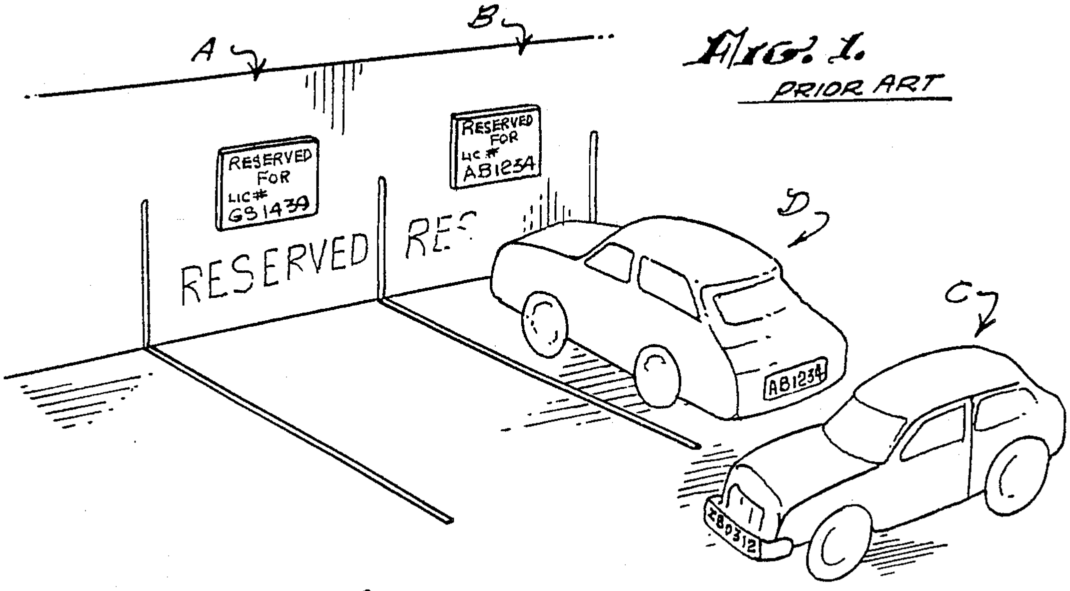
FIG. 1. PRIOR ART
FIGS. 1, 2 and 3 illustrate the prior art in its most commonly used form, for securing the privacy of a parking area.

The first three figures illustrate one of the common problems encountered in reserved parking areas. In FIG. 1 two marked off parking spaces are shown as A and B. They are indicated to have signs showing reservation according to certain vehicle license numbers. Other designations are frequent but for purposes of this illustration the license numbers serve well. It is noted that vehicle C is about to pull into parking space A and it is the wrong vehicle license number. Vehicle D, on the other hand, is properly parked in its designated space.

Figure 2:
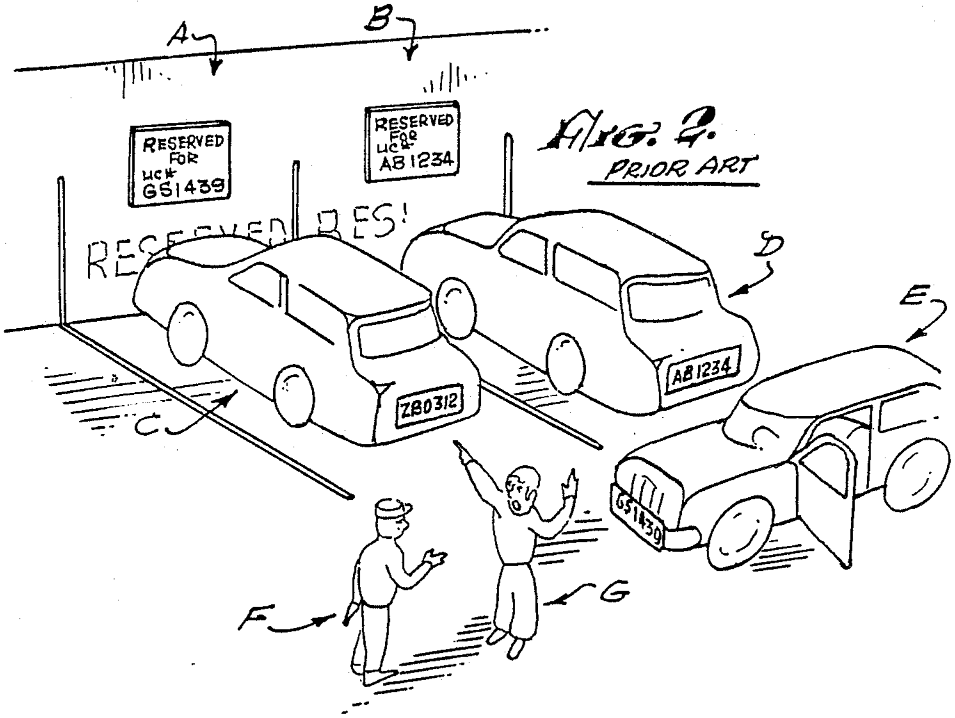
FIG. 2. PRIOR ART

In FIG. 2 it is shown that vehicle C has in fact parked in the wrong space and the driver has left. The appropriate individual G driving vehicle E, the proper vehicle to park in space A is shown complaining to the parking attendant F.

Figure 3:
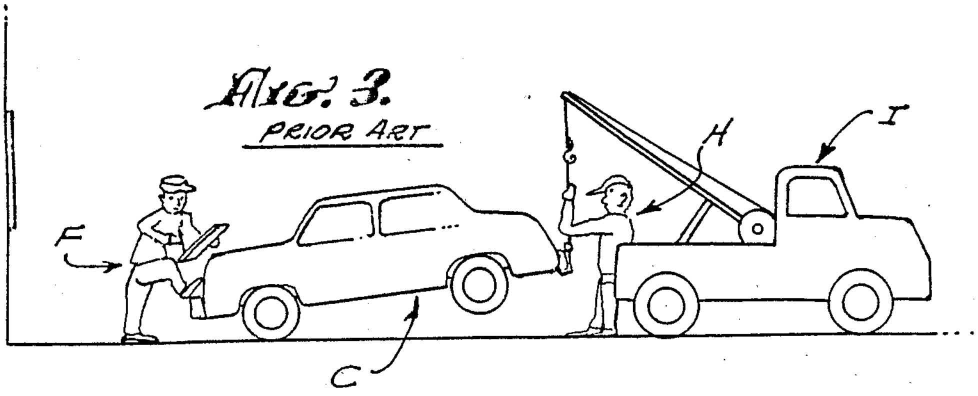
FIG. 3. PRIOR ART

In FIG. 3 the parking attendant F has summoned tow truck driver H with his tow truck I and has hooked on to vehicle C and is preparing to tow it away.

Under the circumstances illustrated by FIGS. 1, 2 and 3, it is entirely possible that the driver of vehicle C would have innocently pulled into the wrong space not noticing the sign for reasons of being in a hurry, a dimly lit area, or the like. Thus there could be great inconvenience for all concerned and there could even be litigation over an improper towing of vehicle C and the consequences thereof. At the same time, the irritation and inconvenience caused to driver G of the proper vehicle E for space A will have been difficult while waiting for the tow truck and waiting to be able to properly park his vehicle.

Figure 4:
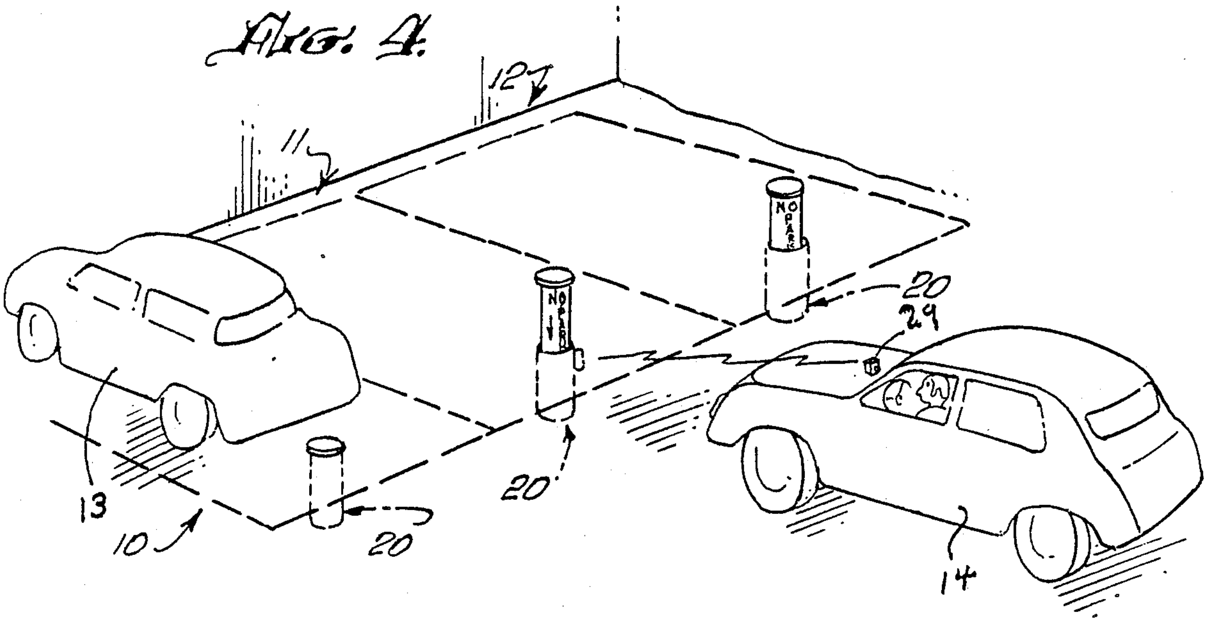
FIG. 4 illustrates parking areas wherein a preferred embodiment of a device to practice the method of this invention is illustrated in place.

With my method and apparatus, as shown in FIG. 4, parking spaces 10, 11, and 12 are clearly marked off and there is no designation indicating a person, license number or the like. Instead, in each of the parking spaces there is a device implanted within the surface shown in this illustration as generally 20. Each of the items is identical and completely block, when elevated as in the case of 11 and 12, the appropriate parking area. In this case vehicle 13 is shown as properly in place with the obstruction cylinder withdrawn into the surface of the parking area so that its top is flush with the top of the parking surface area as will be more clearly understood by examining FIG. 5 wherein the upper cap 23 totally covers and encloses the opening in the surface 15 and wherein the cylinder 21 is permanently imbeded in the foundation material 16 which might be concrete or merely compacted earth or the like.

Figure 5:
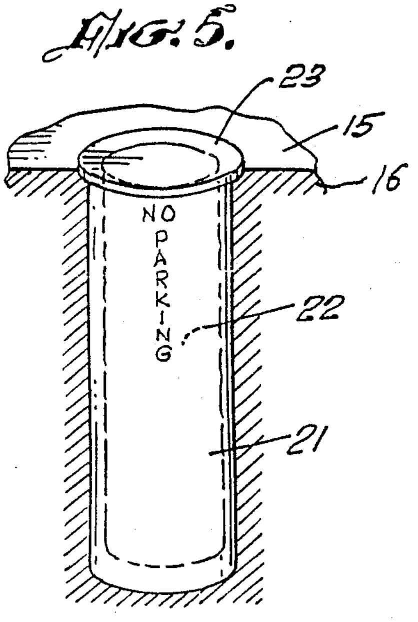
FIG. 5 illustrates one of the devices utilized in FIG. 4 in enlarged scale and in place in such condition as to allow a vehicle to enter.
Figure 6:
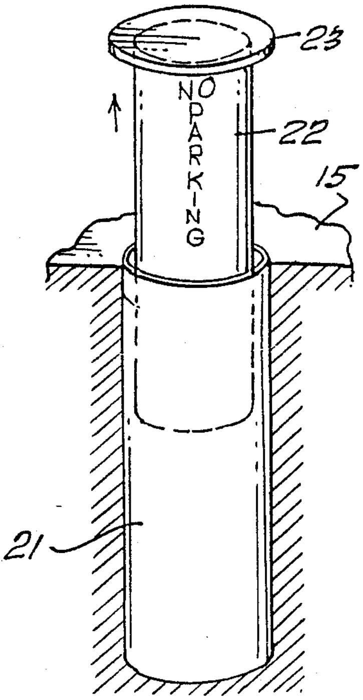
FIG. 6 illustrates a device from FIG. 4 in which the device is activated so as to prevent unauthorized entry.

When the appropriate vehicle is not in place within or upon the parking area designated, the inner cylinder 22 will be elevated as indicated in FIG. 6 in such manner that a vehicle approaching cannot enter. In the illustration of FIG. 4, vehicle 14 is approaching and is equipped with a radio signaling device 29 as is known to those skilled in the art and such as is used in garage door openers and the like. Details thereof are well known. A receiving unit for the signal from that device is shown to exist, particularly in FIG. 7, which will be referred to later. Assuming that the vehicle 14 is the appropriate vehicle to enter space 11 as illustrated in FIG. 4, then the device will receive the signal from the transmitter 29 and the cylinder 22 will be retracted until it is in the same position as shown in FIG. 5.

Figure 7:
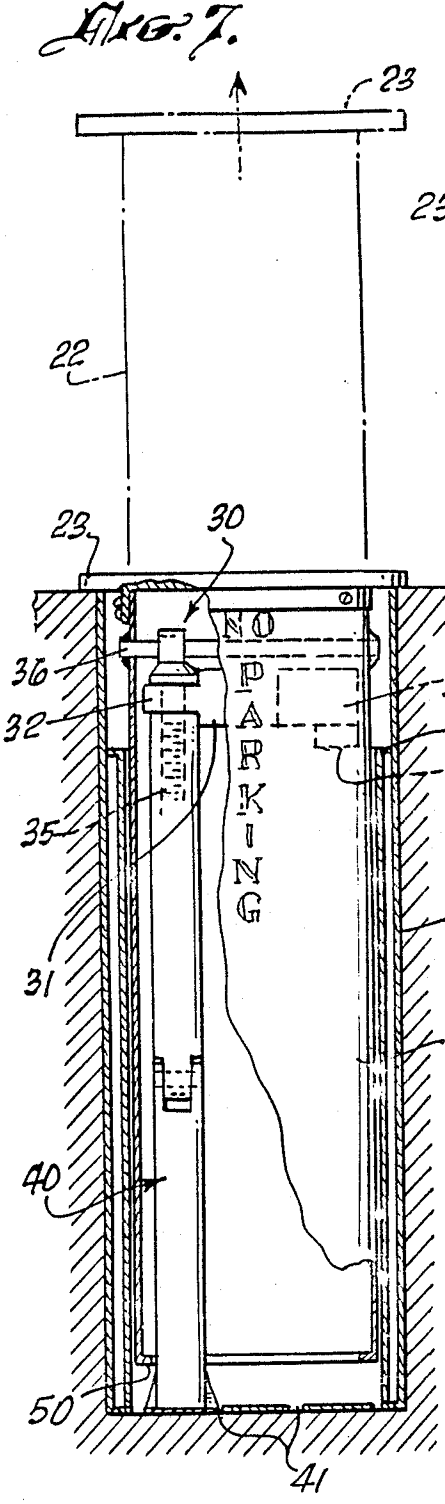
FIG. 7 is a partially broken away partially sectioned view illustrating a device capable of achieving the objects desired of this invention.

Turning attention now to FIG. 7 a preferred embodiment of the device 20 is illustrated in more detail. It is noted that the exterior cylinder 21 is mounted within the foundational material 16. For purposes of clarity and understanding the relationship of cap 23 to the device, the final surface of the parking area has not been illustrated but it will be level with the upper edge of cap 23. Cap 23 is affixed to the interior cylinder 22. Wholely within cylinder 22 will be a worm or screw or the like 35 which is anchored by compaction or welding or otherwise by means known to those skilled in the art in an encasement at 41. The screw or the like turns within this encasement by means of power imparted to worm gear and motor 31–32 or the like in a manner known to those skilled in the art. The motor will in turn be activated by a battery 33 and overall control will be through a radio receiver or the like 34 such as is commonly used in garage door openers and the like. A shaft 36 will be affixed in such manner as to ride upwardly by being attached to the hub 30 to the screw device 35. The screw device 35 will have an extension depending down into space 40 for a desired distance and its exterior will be anchored there in order to provide the anchoring position from which the screw 35 moves the interior cylinder 22 upwardly and downwardly through a customary worm and gear, or the like, drive at 32 as previously described.

A guide or the like as at 39 will also be provided so as to maintain the cylinder 32 in good operating relationship to the exterior cylinder 21.

Figure 7A:
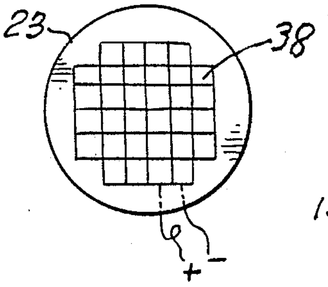
FIG. 7*a* illustrates an alternate embodiment of the top of FIG. 7, in reduced, scale, wherein solar cells are used for recharging a battery utilized within the device.

Drain holes or the like at 50 will be provided in the event there should be moisture entering the interior 22. As shown at FIG. 7*a* it may be desirable to provide solar cells 38 within the cap 23 in order to allow a constant charging of the battery 33 in those conditions wherein there is sufficient light or sunlight.

The details of construction of the worm gear or screw drive has not been shown since they are known to those skilled in the art. Also the details of the motor 31 has not been shown since this will normally be a direct current motor operated from battery 33 and will be a reversable motor in order that it may travel in both directions and carry the cylinder 22 by its connection through the shaft 36 upwardly and downwardly as desired. Likewise, if desired it will be understood that the worm and screw connection could be located further down within the cylinder 22 if desired but it is preferable to have it near the upper portion for purposes of easy recharging of the battery 33. It is to be understood that a motor operated by wiring embeded in the foundational area 16, or otherwise, could also be utilized, but with this arrangement there are no exterior wires to be in the way or cause problems.

Figure 8:
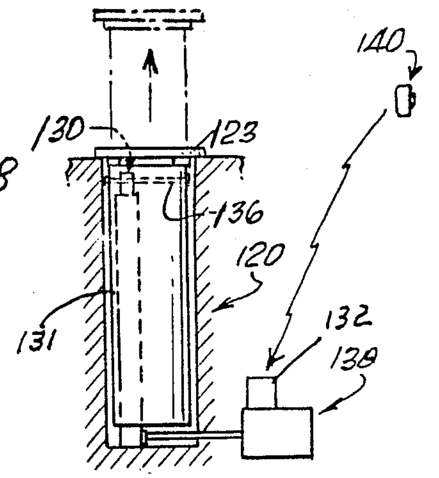

FIG. 8 illustrates an alternate embodiment of this invention wherein the general arrangement of the cylinders 120 is such that a pneumatic power source 138 can provide pneumatic pressure to a cylinder 131 having a shaft 130 attached to the connector 136 to the interior cylinder and by activating the pneumatic power unit 130 remotely through receiving device 132 and transmitting device 140 the inner cylinder can be forced upwardly by pneumatic power and maintained in that position until released by a release valve connected to the pneumatic power system by means known to those skilled in the art such that the pressure is relieved and the interior cylinder drops because of its own weight.

Figure 9:
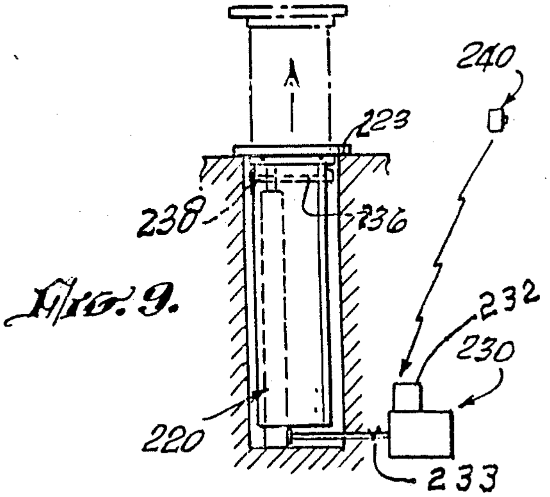

In FIG. 9 there is illustrated a mechanism similar to that shown by FIG. 8, but wherein an hydraulic power unit 230 is activated through remote receiving device 232 and remote sending device 240. In this case, a valve 233 has also been shown since the hydraulic fluid will be forced to the pipe indicated, in a manner known to those skilled in the art, and into hydraulic cylinder 220 which will force hydraulic cylinder ram 238 upwardly and thus carry, through the connecting shaft 236, the interior cylinder in a upward direction and upon release of the valve 233 by the remote control connection by means known to those skilled in the art, the upstanding cylinder will, by its own weight, force the hydraulic fluid back into a reservoir contained within the unit 230.

In both cases shown by FIGS. 8 and 9 the power source can be a battery or it can be other electrical power or it can even be a common hydraulic or pneumatic system running thoughout a general area and connected individually to each of a number of different devices to practice the method of this invention.

Figure 10:
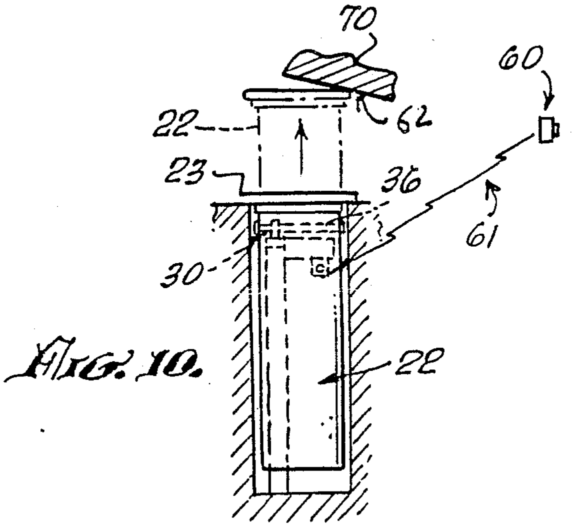
FIG. 10 illustrates a safety feature which can be incorporated to cause the reversal of the movement of the device to practice the method of this invention in case of a dangerous obstruction.

FIG. 10 illustrates the problem where for some reason the device may be inadvertantly activated while a vehicle 70 or other obstruction may be over the cylinder 22. In such case a micro switch, pressure switch, or the like will be incorporated or cooperative with the cylinder 22, or cap 23 or otherwise within the device. In that case, if inadvertantly activated upon contact being made as indicated, the cylinder 22 will reverse its direction and go back to its initial resting position. This will be much in the manner of garage doors and the like which activate on such a principle.

I have referred to garage doors and the like several times throughout the description of this invention. This is not to imply that this invention has anything to do with garage doors. Theoretically a device like a garage door conceivably could be used to come down from a structure above a parking space in order to close off such parking space. However, that would not achieve the object or advantage of this invention, since such would be exorbitantly expensive and additionally would cause problems for the driver in leaving the space after parking his vehicle, and the like. The only reason for mentioning such devices is that they are known to mechanics who might install devices to practice the method of this invention and thus all of the elements are known, but applied in an entirely different manner for purposes of merely raising this inexpensive and practical device into position of blocking an area for privacy, exclusive use, security, or the like.

While the embodiments of this invention shown and described are fully capable of achieving the objects and advantages desired, it is to be understood that such embodiments are for purpose of illustration only and not for purposes of limitation.

I claim:

1. The method of securing a parking area against unauthorized use comprising the steps of: providing an opening in the parking area surface and extending a depth below the surface of a parking area; placing an obstacle such as as a cylinder within said opening in such manner that the top of said obstacle is flush with the surface of the parking area; providing a first device suitable to raise and lower the cylinder, said first device being anchored to the bottom of the opening in the parking area; fastening a second device suitable to move said cylinder on said anchored device and to said cylinder in such manner that it will move said cylinder upwardly and downwardly in cooperation with the anchored device; providing a source of power for said anchored device; activating said source of power remotely from the source of power itself, so as to cause movement of said cylinder.

2. The method of claim 1 wherein a first cylinder is provided within the opening in the surface extending a depth below the surface and a second cylinder is placed within said first cylinder in said opening in such manner that the top of said second cylinder obstacle is flush with the surface of the parking area, and in which said second cylinder is the cylinder which is caused to move.

3. The method of claim 2 wherein the anchored device is a threaded rod connected to the obstacle cylinder in such manner that upon rotation it raises said obstacle clyinder.

4. The apparatus of claim 3 wherein the source of power rotating said anchored device is an electrical battery.

5. The method of claim 4 wherein the second device suitable to move said cylinder is activated by remote radio signal.

6. An apparatus for securing a parking area from unauthorized use comprising in combination: an opening in the surface of the parking area extending a distance below the surface area; a first activating device anchored to the bottom of said opening in the surface; a second activating device cooperable with, and mounted cooperatively with, said first activating device; a cylinder connected to said first and second activating devices and being mounted within said opening in such manner that the top of said cylinder is flush with the surface of the parking area; power means carried within said cylinder in such manner as to be able to impart movement to said first and second activating devices so as to cause said cylinder to be capable of ascent and descent relative to the surface area.

7. The apparatus of claim 6 wherein a first cylinder is mounted within the opening beneath the surface area and a second cylinder is mounted within that area, which second cylinder is the moveable cylinder recited in claim 6.

8. An apparatus for securing a parking area from unauthorzed use comprising in combination: an opening in the surface of the parking area extending a distance below the surface area; a first cylinder mounted within said opening and affixed therein with one end adjacent to the bottom of said opening and one end adjacent the surface area; a second cylinder mounted within said first cylinder and having a cap on its top which rests upon said end of said first cylinder adjacent the surface area; a threaded rod anchored to the bottom of said opening in the foundational material beneath the surface area;

rotatable threaded means cooperable with and mounted upon said threaded rods, and connected to said second cylinder in such manner that said second cylinder will move upwardly or downwardly with relation to the surface area upon activation of said second activating device; power means comprising a reversable electric motor and a battery for electrical power carried within said second cylinder in such manner as to be able to activate the movement of said activating device in such manner as to cause the said second cylinder to be capable of moving upwardly and downwardly.

9. The apparatus of claim 8 wherein the said first and second activating devices comprise a threaded rod and screw or worm gear arrangement.

10. The apparatus of claim 9 wherein the activating power source is an hydraulic power unit and the first and second activating devices are hydraulic cylinder and hydraulic cylinder rod respectively.

11. The apparatus of claim 9 wherein activating source is a pneumatic power unit and the first and second activating devices are pneumatic cylinder and pneumatic cylinder rod respectively.

* * * * *